United States Patent Office 3,846,174
Patented Nov. 5, 1974

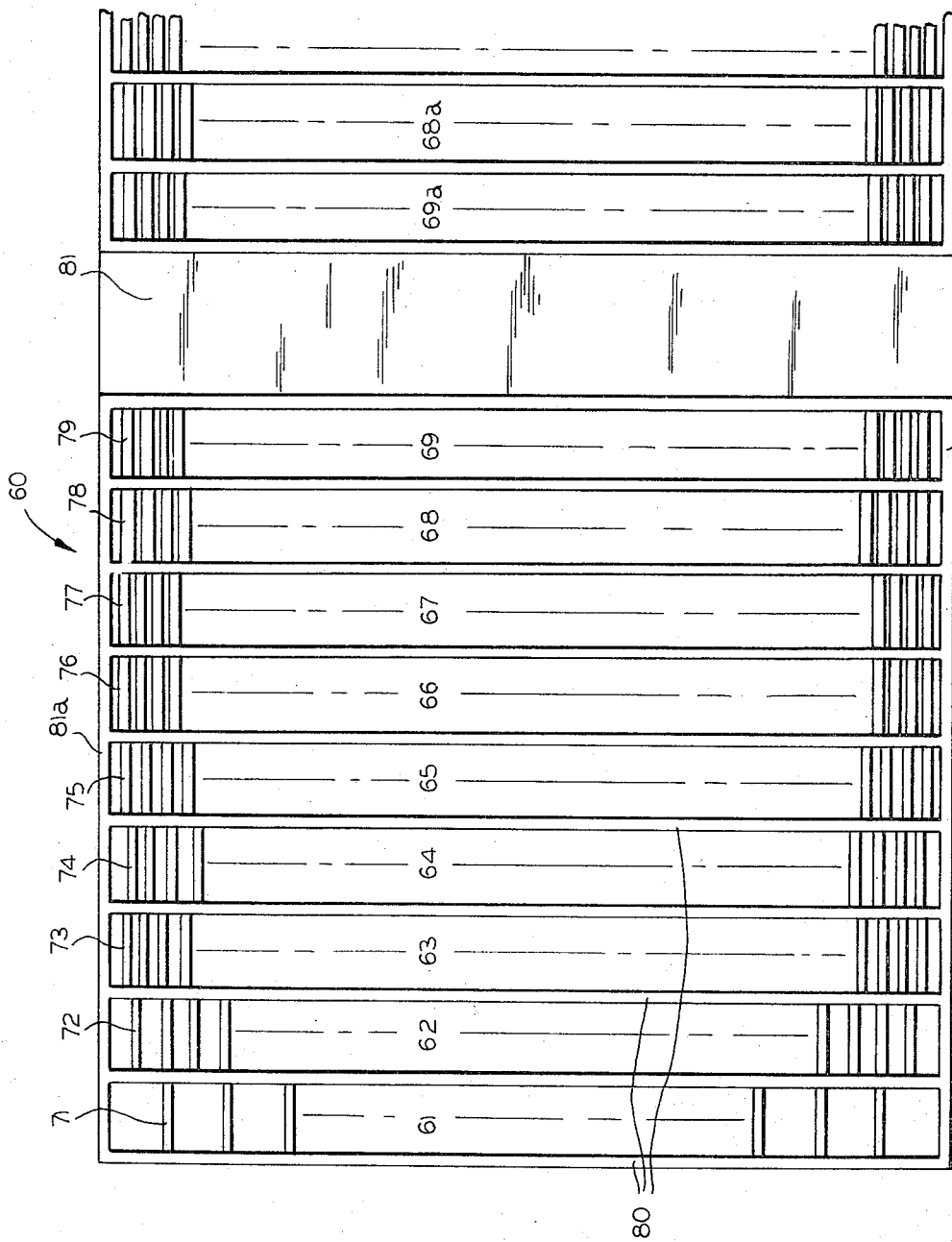
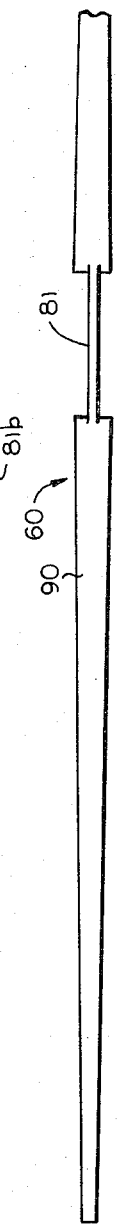
FIG.7
FIG.7A

3,846,174
PROPORTIONED CURRENT BATTERY
Edward L. Barrett, 506 Malden Ave.,
La Grange Park, Ill. 60525
Filed Apr. 11, 1973, Ser. No. 350,009
Int. Cl. H01m 35/04
U.S. Cl. 136—6 R
8 Claims

ABSTRACT OF THE DISCLOSURE

An electrical cell, either a primary cell or a storage battery, which has approximately the same current flow through every section of the cell electrodes, thereby increasing efficiency of the battery and prolonging the battery life; the battery electrode plates are thick at one end and taper down to a thin end, with the terminals being connected to the thick ends of the electrodes. The thin portion of each plate is aligned opposite the thick thick portion of each adjacent plate, so that the current flows into the thick end of one electrode, proportionately through the entire area of that electrode and through an electrolyte to a second electrode, proportionately through the entire area of the second electrode, and out the thick end of the second electrode.

BACKGROUND OF THE INVENTION

Although the present invention is applicable to various types of batteries, such as silver-zinc, nickel-cadmium and tho like, it will be described in connection with the lead-acid type commonly used in automotive vehicles, aircraft, submarines and electric torpedoes, and in many other fields.

Lead-acid battery plates customarily are made by providing a grid of lead, the vertical and horizontal runners of which define rectangular pockets into which the active materials are pasted. The plates are uniformly thick, so that when positive plates are interlaced with negative plates, the spacing between plates will be uniform. The grid is depended upon to retain the active material and to carry electrical current from the active areas to a common terminal point, usually at the top, and to one side of the plate. The active material in the negative plate pockets is usually a spongy lead. The positive plate pockets contain a form of lead peroxide, also spongy, so that the electrolyte ($H_2SO_4$) may penetrate the surface and reach all of the material in the pockets. This porosity, in effect, increases the area of active material exposed to the electrolyte.

Particles of the active materials must be in good electrical contact with one another and with portions of the grid, to establish circuits for current to flow to the terminal point. These areas of contact also must be minute to preserve the required porosity. For this reason, the active material areas offer considerably higher resistance to the flow of current than the solid grid material. The runners constituting the grid, therefore, should be of sufficient cross section to carry virtually all of the current developed in the plate and to avoid pocket-to-pocket transfer of current and possibly temperature rise in the higher resistance materials. Abnormal heat in the active material can drive the electrolyte away and reduce normal plate capacity, and it can do permanent damage to the affected areas by reducing porosity or by further increasing resistance.

No provision is made, in present day batteries, to proportion the cross sectional areas of the current carrying members in the line of flow of the current, to suit the current carried and, at the same time, to provide equal amounts of active material in all pockets. When the vertical runners are not proportioned to the current, much of the accumulated energy must be carried by the higher resistance, active material in the higher rows, with the grave danger of destruction or serious effect on the life of the battery.

Another disadvantageous condition exists in batteries with suspended plates. The lengths of the current paths between top rows of positive pockets and reacting top rows of negative pockets is considerably shorter, and therefore of lower resistance, than the paths between positive and negative pockets in the lower rows. The voltage developed at the bottom rows may be the same as at the top rows but the resistance in the longer path, through which the lower active material must work, causes a higher voltage drop and increases the burden on the already deficient circuits involving the upper areas. This is especially important with respect to high current surges, such as occur when energizing the starting motor of a vehicle. The voltage drop in a circuit is equal to the current multiplied by the resistance, which results in the upper active materials working in the lower resistance circuits and assuming more of the load.

When a storage battery is being recharged, similar conditions exist. Because the charging current will flow at higher density in the path of least resistance, the upper areas of the plates must absorb this shock also, especially on a "quick" charge. Thus, the active materials, in the top rows, both on charge and discharge, are working under potentially destructive conditions, and may well terminate the useful life of the battery while much unused active material still remains over large areas of the plates.

The ideal battery would be one wherein *all* active materials work under uniform conditions, both on charge and discharge; there would be no cross flow in the plates, occasioned by side terminals; the current conducting portions of the grids would be proportioned, in the direction of current flow, to the amount of current carried; there would be uniform spacing of all positive and negative areas; there would be uniform quantities of active material in each pocket, even though the cross section of the associated conducting material might be different for each pocket; and all areas of active materials would be working in paths of like resistance, both on charge and discharge.

One of the problems in a common automobile storage battery is the build-up of scale in the battery cells. This scale builds up first at the top of each electrode and drops down, filling up the cell, which causes battery failure. One of the reasons for the rapid build-up of this scale is the large current flowing between the very top portions of the electrodes, which causes the scale to build up rapidly along the top of the electrode. Consequently it is desirable to avoid the formation of large amounts of scale in a battery to prolong the life of the battery.

Similarly, since a larger amount of current flows through the very top areas of the electrodes and lesser amounts through the bottoms of the electrodes, a decrease in efficiency is caused. Since a part of each electrode carries a reduced current, the electrodes have to be made larger in order to carry the total amount of current desired. Thus, it is desirable for the current to be transferred evenly throughout the electrode, so that the optimum utilization of the electrode can be made and the electrodes can be reduced in size, thus saving space and reducing the amount of raw materials necessary for the electrodes.

In U.S. Pat. 3,434,833 this problem was confronted to a limited extent; the proposed solution was a cylindrical lead acid cell containing complex conical grids. However, the entire battery is so complex and so radically different from conventional batteries that it would be difficult to produce with conventional equipment. Moreover, truly equalized current distribution was not achieved. Thus, it is desirable to obtain a battery with improved equalized current distribution which can be made by conventional equipment.

SUMMARY OF THE INVENTION

It is a principal object of the present invention, therefore, to provide a new and improved battery which provides an equalized current flow across each area of the electrode.

A further object of the invention is to provide a battery with electrodes constructed to afford substantially maximum efficiency over the entire surface area of each electrode.

Another object is to provide a battery wherein all active materials work under uniform conditions, both on charge and discharge.

A related object is to provide a battery with a reduced total crosss sectional area of electrodes, as compared with a conventional battery, while providing equal operating characteristics equal to those of a conventional battery.

A general object of the invention is to provide a substantially improved battery which can be manufactured through conventional manufacturing processes and equipment.

Other objects are to provide a battery with the features of the ideal battery already mentioned.

In accordance with the invention, an electrical battery including at least one cell comprising a plurality of positive plates interleaved one-for-one with a plurality of negative plates, with all plates immersed in a solid or liquid electrolyte, each plate having a current collection or discharge element at one end of the plate, and each plate being tapered in thickness from a thick portion adjacent to the current collection or discharge element of the plate to a thin portion at the opposite end of the plate, the thin portion of each plate being aligned opposite the thick portion of each adjacent plate.

BRIEF DESCRIPTION OF THE DRAWINGS

Other objects and advantages of the invention will become apparent upon reading the following detailed description and upon reference to the drawings, in which:

FIG. 7 is an elevation view of an embodiment of a combination plate of the present invention;

FIG. 7A is a plan view of the plate of FIG. 7; and

While the invention will be described in connection with preferred embodiments, it will be understood that it is not intended to limit the invention to those embodiments. On the contrary, it is intended to cover all alternatives, modifications and equivalents as may be included within the sphere and scope of the invention as defined by the appended claims.

DETAILED DESCRIPTION OF THE INVENTION

Figure 1:
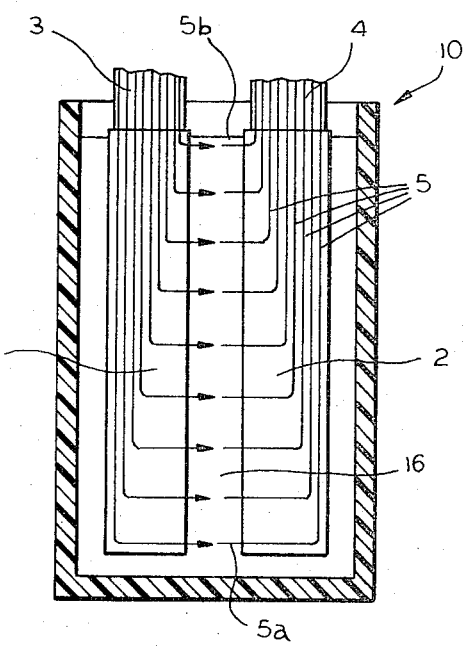
FIG. 1 is a schematic diagram of a conventional two-electrode battery.

Shown in FIG. 1 is a schematic of a conventional battery 10 including two electrodes 1 and 2. Electrodes 1 and 2 can be either positive or negative electrodes, depending on the material used to construct the electrode and upon the electrolyte 16 filling the space between the electrodes. The schematic current paths from plate 1 to electrode 2, and from collector 3 to collector 4 are shown by the arrows 5. As the paths 5 get farther away from the collectors 3 and 4, they become longer. Current flowing through these longer paths undergoes, consequently, more resistance. Thus, less current flows through the bottom parts of the plates 1 and 2 than through the tops of the electrodes; there is a heavy current near path 5b at the top of the plates and a much lighter current at the bottom of the electrodes, near path 5a. The plates are either thicker than necessary for the light current at the bottom or too thin for the heavy current at the top.

Figure 2:
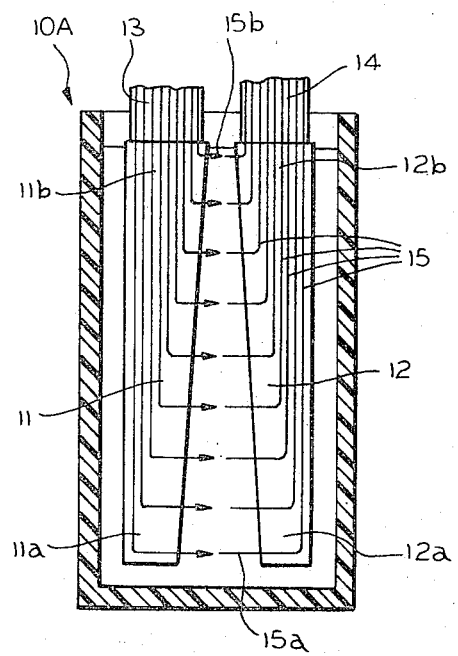
FIG. 2 is a schematic diagram of a battery having tapered electrodes, with the current collector at the top of each electrode.

An ineffective use of tapered electrodes for evenly proportioning current is shown in the cell 10A of FIG. 2, where two tapered electrodes 11 and 12 with their collector elements 13 and 14, respectively, are shown aligned so that the thick ends 11b and 12b are adjacent to each other and their thin ends 11a and 12a are adjacent to each other. As can be observed from the current paths 15, although the paths 15a that the current takes at the lower ends of the electrodes are slightly shorter than the paths 5a in a conventional battery (FIG. 1), the lengths of the paths 15a through the electrolyte is longer. Consequently, there is still a wide disparity between the resistance of different current paths, with the resistance increasing from path 15b toward path 15a. Thus, there will be the same type of problems with these tapered electrodes as with untapered conventional electrodes.

Figure 3:
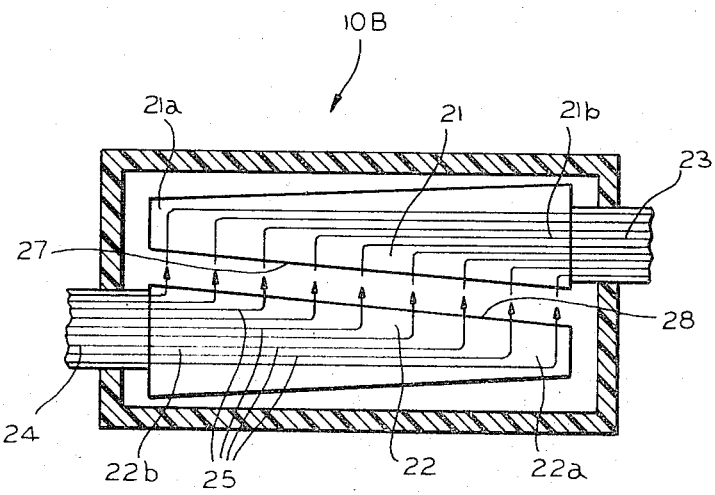
FIG. 3 is a schematic diagram of a two-electrode cell constructed in accordance with the principles of the present invention.

The basic electrical arrangement of the present invention is shown in FIG. 3 in the two-electrode cell 10B. Cell 10B includes two tapered electrodes 21 and 22 aligned with their collector ends 23 and 24 opposite each other so that the thick end of each electrode 21b and 22b is adjacent to the thin end of 21a and 22a of each adjacent electrode. The surface 27 of electrode 21 is parallel to the surface 28 of electrode 22 to provide an even spacing between the adjacent electrodes 21 and 22 throughout their lengths. It can be seen that each one of the current paths 25 extends an equal distance from one of the collector elements 23 to the other of the collector elements 24. Furthermore, each path travels through the same amount of electrolyte and the same distance through each electrode. Consequently, the resistance for each path is the same. Thus, an equalized current flow is established across the entire surface area of the electrodes surfaces 27 and 28. Consequently, there are no areas of high current flow which could cause excessive scaling and rapid deterioration of the electrode, and there are no areas of low current transfer to cause inefficiency in use of the electrodes.

Figure 4:
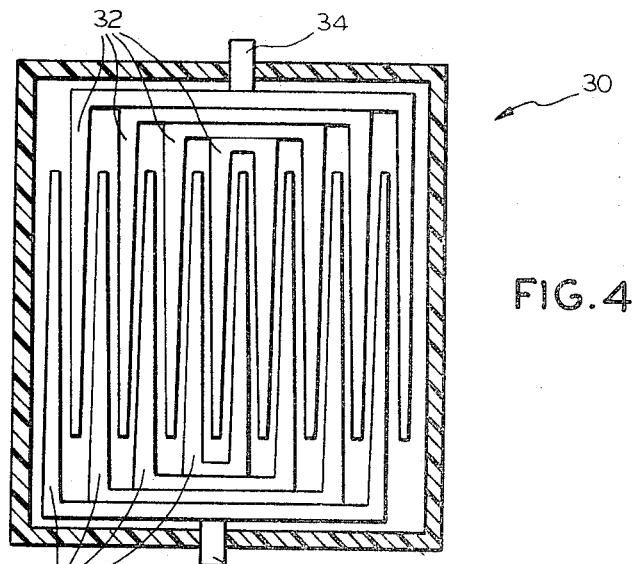
FIG. 4 is a schematic plan view of a battery constructed in accordance with one embodiment of the present invention.

One embodiment of a multi-plate battery 30 which is encompassed by the present invention can be seen in FIG. 4, which is a top view of the battery. Battery 30 includes a single cell in which a series of negative plates 31 are interleaved one-for-one with a series of positive plates 32. Each plate is connected to the respective negative or positive collector element 33 and 34. In this embodiment of the invention it can be seen that all of the electrodes can be fabricated in a series of U-shaped molds having similar leg portions but varying lengths to the bight portion of the molds. For limited production a single mold with an extendible bight section can be used.

Figure 5:
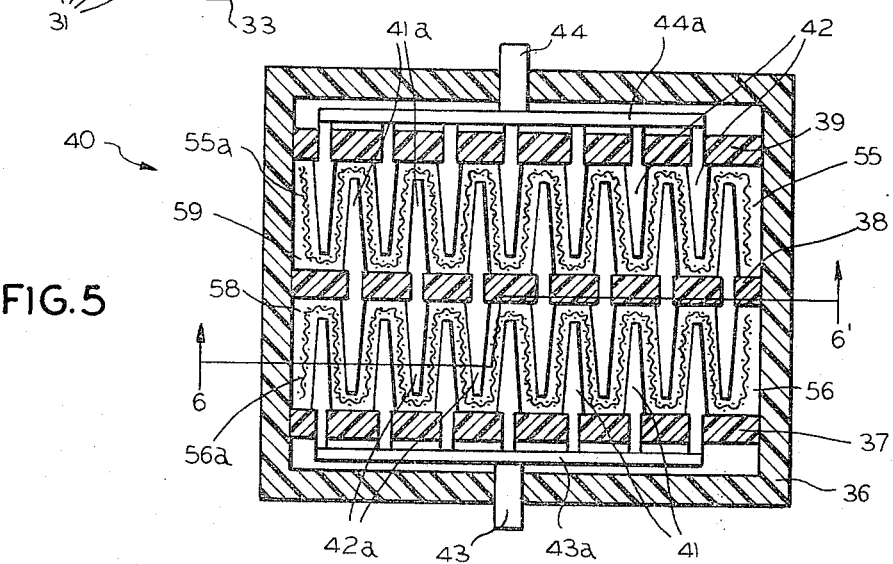
FIG. 5 is a plan view of a two-cell battery constructed in accordance with another embodiment of the present invention.

FIG. 5 consists of the top view of a two-cell battery 40 constructed in accordance with another embodiment of the present invention. Battery 40 is also shown in vertical cross section in FIG. 6. The battery 40 comprises a first cell 55 and another cell 56, formed by a casing 36 and three dividers 37, 38 and 39, with spaces for electrolyte 58 and 59 respectively. Thus, current can flow from a positive collector or terminal 44 through a positive collector bus 44a to each of the multiplicity of positive electrodes 42 and through the electrolyte 59 in cell 55 to the negative electrodes 41a of cell 55. These negative eelctrodes of cell 55 are each formed integrally with one of the positive electrodes 42a of cell 56. The current flows from these positive electrodes 42a through the electrolyte 58 in cell 56 to the negative electrodes 41 of cell 56. Each of these negative electrodes is connected to a negative collector bus 43a which is in turn connected to the negative collector terminal 43 so that the current flows from each of the negative electrodes 41 through the collector bus 43a to the collector 43.

In battery 40, all of the electrodes are held in place by the partitions 37–39 which run the full width of the battery case 36 and separate the electrolyte of cell 55 from the electrolyte of cell 56 and also separate the electorlyte in each cell from the collector buses 44a and 43a. The entire arrangement of the electrodes, partitions, collectors and collector buses is firmly fixed within the battery case 36.

Each of the cells 56 and 55 can be filled with either a liquid or a solid electrolyte in the spaces 58 and 59 respectively. Of course, the type of electrolyte depends not only on the type of battery desired but also on the type of electrodes used. In accordance with a further aspect of the invention, zigzag plate separators 55a and 56a can be inserted between the electrodes in cells 55 and 56 respectively. One advantage of the alignment of the electrodes as described in the present invention is that these plate separators can be readily formed by folding the plate separator material by conventional apparatus.

Figure 6:
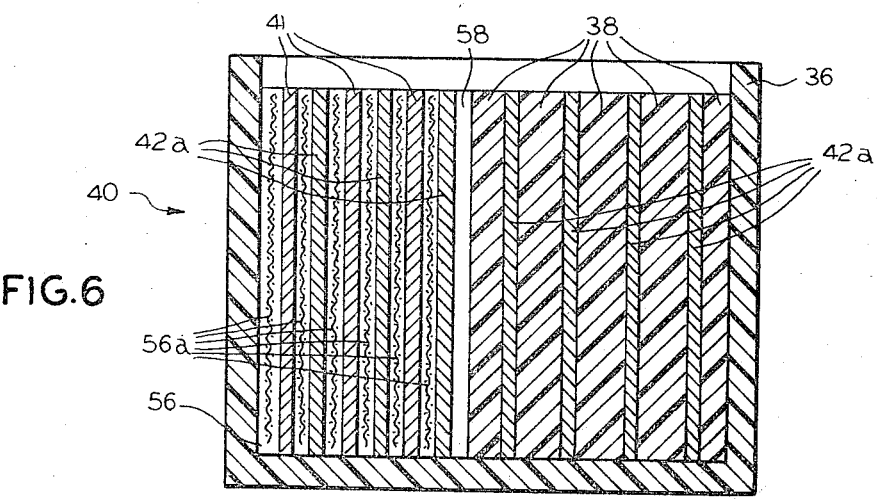
FIG. 6 is an elevation sectional view of the battery of FIG. 5 taken approximately along line 6–6' in FIG. 5.

FIG. 7 is an elevation view of a combination plate 60 constructed in accordance with one embodiment of the invention and suitable for use in the battery such as the battery 40 of FIGS. 5 and 6. On one side, plate 60 has nine rows of pockets, 61–69. The other side of plate 60 is of corresponding construction, including rows of pockets such as rows 69a and 68a.

The pockets in rows 61–69 are defined by a multiplicity of posts 71–79 connecting the vertical runners 80 that separate the rows of pockets. Posts 71–79 vary in number and diameter to suit the amount of current in that pocket to be carried by the different sections of plate 60, while at the same time providing equal space for active material (not shown) that is deposited in all pockets. It is possible, in the battery, to allow equal space, in each pocket, for active material and, at the same time, provide current carrying paths of widely different cross sections, because the plates are tapered.

The posts 71–79 (which may also be called subrunners) run through the active material, forming a current collecting means and an anchoring means for the spongy active materials (not shown). The widths of the plates, the number of pockets and cross sections may vary to suit specified performance requirements.

Table 1 shows the specifications for the plates of a twelve volt battery approximately eleven inches long, eight inches high, and seven inches wide. It has a higher ampere/hour capacity than present batteries, it can stand higher current surges, and has a longer useful life.

TABLE 1

| Pocket number | Cross-sectional (C.S.) area of active material in sq. in. | C.S. area of nonactive grid in sq. in. (not including plate frame) | Total cross-sectional area in sq. in. | Diameter of posts (sub-runners) in inches | Number of posts | Spacing of posts (center to center in inches) | Thickness of plate at vertical center line in inches |
|---|---|---|---|---|---|---|---|
| 61 | .335 | .025 | .360 | .030 | 35 | .166 | .060 |
| 62 | .335 | .055 | .390 | .035 | 35 | .166 | .065 |
| 63 | .335 | .085 | .420 | .050 | 43 | .142 | .070 |
| 64 | .335 | .115 | .450 | .055 | 47 | .130 | .075 |
| 65 | .335 | .145 | .480 | .060 | 51 | .120 | .080 |
| 66 | .335 | .175 | .510 | .065 | 53 | .115 | .085 |
| 67 | .335 | .205 | .540 | .070 | 53 | .115 | .090 |
| 68 | .335 | .235 | .570 | .075 | 53 | .115 | .095 |
| 69 | .335 | .265 | .600 | .080 | 53 | .115 | .100 |

It should be noted that the non-active (current conducting) portion of pocket 69 (.265 sq. in.) is approximately ten and one-half times that of pocket 61 (.025 sq. in.). Not only do the cylindrical posts of pocket 69 carry all the current developed in that pocket but, in addition, they carry the current developed in all other pockets on their side of the jumper 81 that joins the two halves of plate 60. Pocket 62 has .055 sq. in. of cross section in its non-active grid which is approximately twice that of pocket 61, .025 sq. in., because its horizontal conductors (posts 72) carry all the current developed in pocket 61, and all the current developed in its own active material (pocket 62).

The same is true of all other pockets. Each set of horizontal posts, 71–79, is proportioned to carry the current developed in the active material in its respective pocket, 61–69, with which it is in contact and, in addition, the current developed in all of the pockets preceding it in the circuit. The entire conductive grid structure for both sides of plate 60 is formed as a single casting, including the runners, the sub-runners or posts and the connector between the two plate elements. In a lead-acid battery, a lead casting is usually employed, though a casting of another metal with a lead coating may be utilized.

The jumper 81 has a cross sectional area of non-active material corresponding to approximately the total cross sectional area of the non-active posts 79 in pocket 69 plus the side rails 81a and 81b. Thus, the connecting jumper 81 is approximately .046 in. thick, running the full width of the plate, 6 inches, for side rails 81a and 81b of approximately .094 in. and .100 in. length and width. Consequently, the jumper 81 is equal in conducting capacity to the adjacent portion of the lead grid constituting the pocket 69; furthermore, the flow of current is directly across the grid structure from pocket 69 to pocket 69A with little or no current flow transversely of the plate, affording maximum efficiency in this regard.

FIG. 7A is a plan view of the combination plate 60 of FIG. 7 now coated with an active material 90. As can be seen the plate tapers from 0.100 inches at the center of pocket 69 to 0.060 inches at the center of pocket 61.

In a battery the tapered plates 60 maintain uniform spacing between plates (through the electrolyte) and, at the same time, provide graduated cross sections in the current conducting runners, to suit the amount of current carried, and provide uniform quantities of active material in every pocket. As can be seen, the tapering of the plates is in the non-active materials, while the active material remains constant along the length of the plate.

One of the most important uses for storage batteries in the military is in both atomic-powered and conventional engine powered submarines. Virtually all submarines require standby batteries capable of driving the submarine over great distances in event of failure or inavailability of the main propulsion system. Submarine batteries usually comprise a number of individual cells connected by jumpers so that if one cell fails, it may be cut out of the series circuit by connecting the cells on either side of it with a temporary jumper.

Figure 8:
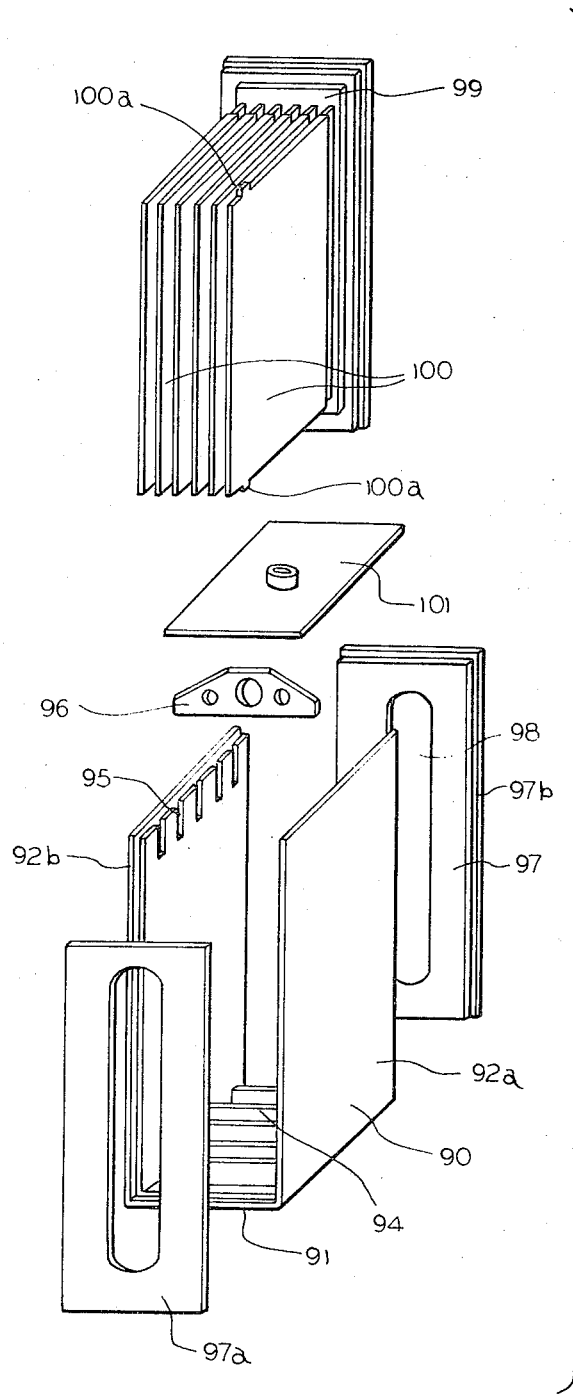
FIG. 8 shows a partial exploded view of the construction of another embodiment of a battery of the present invention.

FIG. 8 illustrates such a single cell, many of which may be connected in series by flat plates outside the cells so that one of the objectives may be met by having the connecting plate as wide as the battery plates are high, and secured by a row of threaded studs and nuts from top to bottom of the cells.

FIG. 8 shows partial exploded details of a single battery cell (lead-acid) with tapered plates 100 and side headers 99. A case part 90 comprising a bottom 91 and two end panels 92a and 92b with plate support rails 94 has slots 95 for bridge members 96. A side panel 97 has an opening 98 to receive a boss of like form (not shown), on the header 99, to which the tapered positive plates 100 are attached. An "O" ring (not shown) will be stretched to an oval shape, to surround the boss. A terminal plate, also not shown, will be secured (outside the side panel 97) to the boss. The terminal plate is made larger than the boss, all around, overlapping the edges of the opening 98 and sealing the boss of the header 99 and the side panel 97 with the "O" ring as a gasket.

If there are six tapered positive plates, there will be seven tapered negative plates. The negative plates (not shown, but similar to 100) are secured to a side panel 97a in a similar manner. Suitable separators (not shown) may be positioned between the positive and the negative plates. The ears of the positive plates 100a butt against alternative rails and those of the negative plates (not shown) butt against adjacent alternating rails, to minimize short circuits around the separators. Panel 97, with its attached positive plates, is bonded at its shouldered edges 97b, into one side of the case 90. The panel 97a, with its attached negative plates, is positioned into the opposite side of the case, with positive and negative plates interlaced and separated by a suitable separator material. The panel 97a is bonded to the case part 90 to form a sealed, open-top cell compartment. Bridge members 96 are inserted in the slots 95 to contact the upper ears 100a, and hold the plates down. The cover 101 is then bonded into the shouldered top edges of the case.

It should be remembered that the type of batteries described in this invention can be used either as single-use primary cells, or as storage cells which can be reused and recharged. Whenever the storage cell is used and recharged, any of the collector terminals or collector buses can either collect the current or discharge the current depending upon whether the battery is being drained or recharged. Similarly the electrodes labeled positive may be negative as long as there are alternating positive and negative plates.

One of the features of the present type of battery structure is that when the plates are vertically disposed, it is ideal for permitting gases formed on the plates to bubble off out of the active battery region.

Thus it is apparent that there has been provided in accordance with the invention a battery that fully satisfies the objects, aims and advantages set forth above. While the invention has been described in conjunction with specific embodiments thereof, it is evident that many alternatives, modifications and variations will be apparent to those skilled in the art. Accordingly it is intended to embrace all such alternatives, modifications and variations as fall within the spirit and scope of the appended claims.

I claim:

1. An electrical battery comprising at least one cell including a plurality of positive plates interleaved one-for-one with a plurality of negative plates, with all plates immersed in an electrolyte, each plate having a current collection element at one end of the plate, and each plate being tapered in thickness from a thick portion adjacent the current collection element of the plate to a thin portion at the opposite end of the plate, the thin portion of each plate being aligned opposite the thick portion of each adjacent plate with the surface of each plate approximately parallel to the surface of each adjacent plate.

2. An electrical battery according to Claim 1, in which each plate comprises a relatively inactive conductive grid structure supporting active material, and in which the conductive grid structure is tapered to afford substantially equalized current density throughout, from the thin portion to the thick portion of the grid.

3. An electrical battery according to Claim 2, in which the active material of each plate is substantially uniformly distributed from the thick portion to the thin portion of the plate.

4. An electrical battery according to Claim 2, in which the grid structure of each plate comprises a series of spaced runners extending transversely across the plate, and a multiplicity of sub-runners extending between each runner to define pockets for the active material of the plate, the number and diameter of sub-runners varying, from each inter-runner space to the next, to provide an increment of additional cross-sectional current carrying area for each inter-runner space, in comparison with the next adjacent space on the thinner side of the plate, approximating the total current-carrying area of the thinnest space.

5. An electrical battery according to Claim 2, comprising at least two cells, in which the grid structure of each positive plate of one cell is formed integrally with the grid structure of a negative plate for an adjacent cell, the thickest parts of the two plates being interconnected by the grid structure.

6. An electrical battery according to Claim 5, in which the integral grid structure for a positive and a negative plate, in adjacent cells, includes a connector portion extending for the full height of the plates and having a total cross-sectional area approximately equal to the total cross-sectional area of the grid structure in the thickest part of each plate.

7. An electrical battery according to Claim 6, including a case having a plurality of insulator partitions extending across the case, the connector portions of the plates being fitted into complementary slots in the insulator partitions to support the plates in the case.

8. An electrical battery according to Claim 1, and further comprising a unitary zig-zag separator interposed between all of the plates of each cell.

References Cited

UNITED STATES PATENTS

| | | | |
|---|---|---|---|
| 916,320 | 3/1909 | Joel | 136—14 |
| 2,738,374 | 3/1956 | Fuller et al. | 136—7 |

ANTHONY SKAPARS, Primary Examiner

U.S. Cl. X.R.

136—26